(No Model.) 3 Sheets—Sheet 1.
W. A. DREWETT.
VALVE DEVICE FOR DUPLEX ENGINES.

No. 518,025. Patented Apr. 10, 1894.

Witnesses
Inventor
W. A. Drewett,
by Foster and Freeman,
Attorneys (No Model.) 3 Sheets—Sheet 2.
W. A. DREWETT.
VALVE DEVICE FOR DUPLEX ENGINES.
No. 518,025. Patented Apr. 10, 1894.
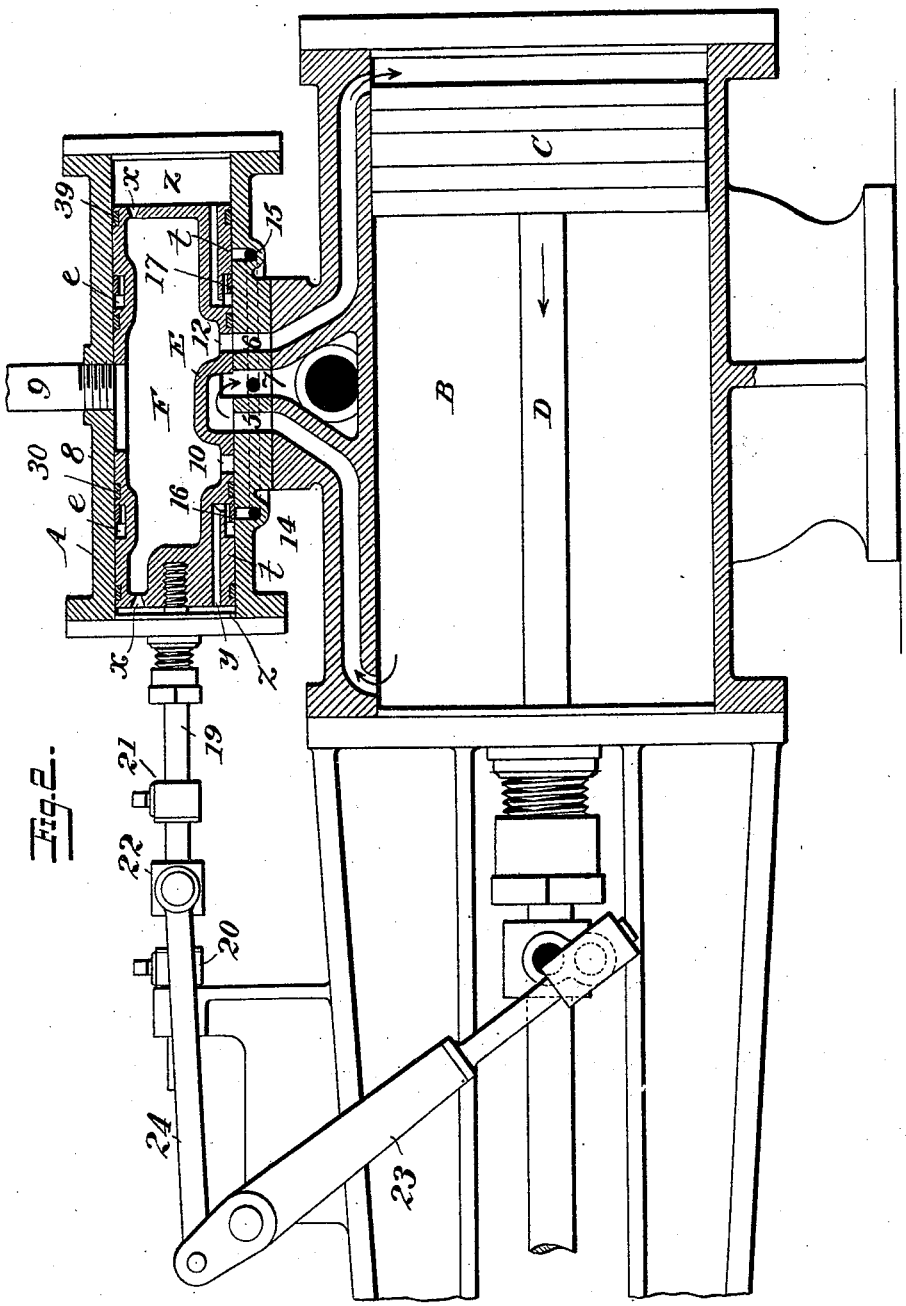
Witnesses
Jno. G. Hinkel
Alle N. Dobson
Inventor
W. A. Drewett,
by Foster & Freeman,
Attorneys
THE NATIONAL LITHOGRAPHING COMPANY,
WASHINGTON, D. C.

(No Model.) 3 Sheets—Sheet 3.
W. A. DREWETT.
VALVE DEVICE FOR DUPLEX ENGINES.
No. 518,025. Patented Apr. 10, 1894.
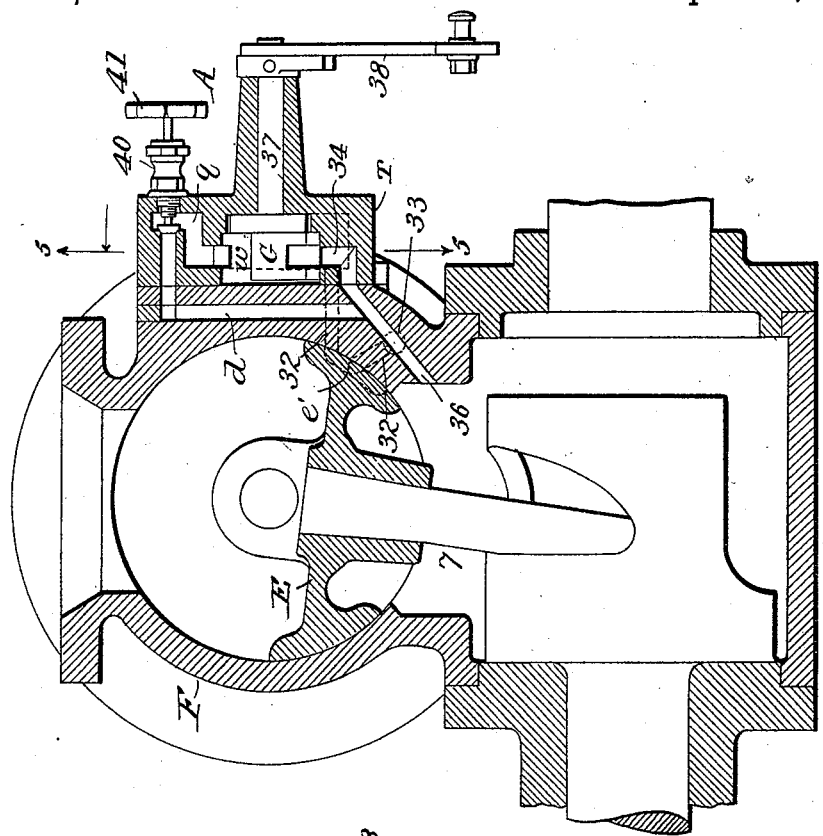
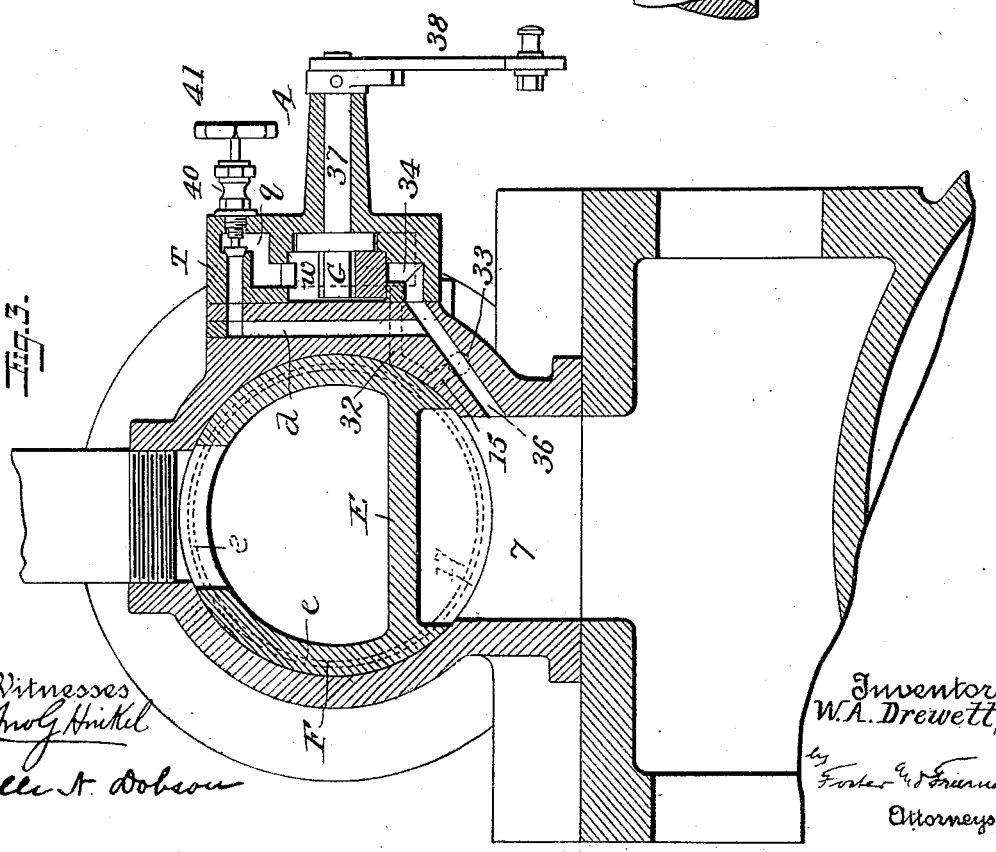
Witnesses
Inventor
W. A. Drewett,
by Foster & Freeman,
Attorneys

UNITED STATES PATENT OFFICE.

WILLIAM ALFRED DREWETT, OF BROOKLYN, NEW YORK.

VALVE DEVICE FOR DUPLEX ENGINES.

SPECIFICATION forming part of Letters Patent No. 518,025, dated April 10, 1894.

Application filed November 14, 1893. Serial No. 490,900. (No model.)

*To all whom it may concern:*

Be it known that I, WILLIAM ALFRED DREWETT, a citizen of the United States, residing at Brooklyn, in the county of Kings and State of New York, have invented certain new and useful Improvements in Valve Devices for Duplex Engines, of which the following is a specification.

My invention relates to improvements in direct acting duplex engines and my invention consists in so constructing the valve devices of said engine that each engine will control the exhaust from the valve device of the other engine to thereby shift the valve of said device, and so that either engine may be thrown out of operation without shifting any of the operating valves of the operating engine and without disconnecting any of the parts.

Figure 1:
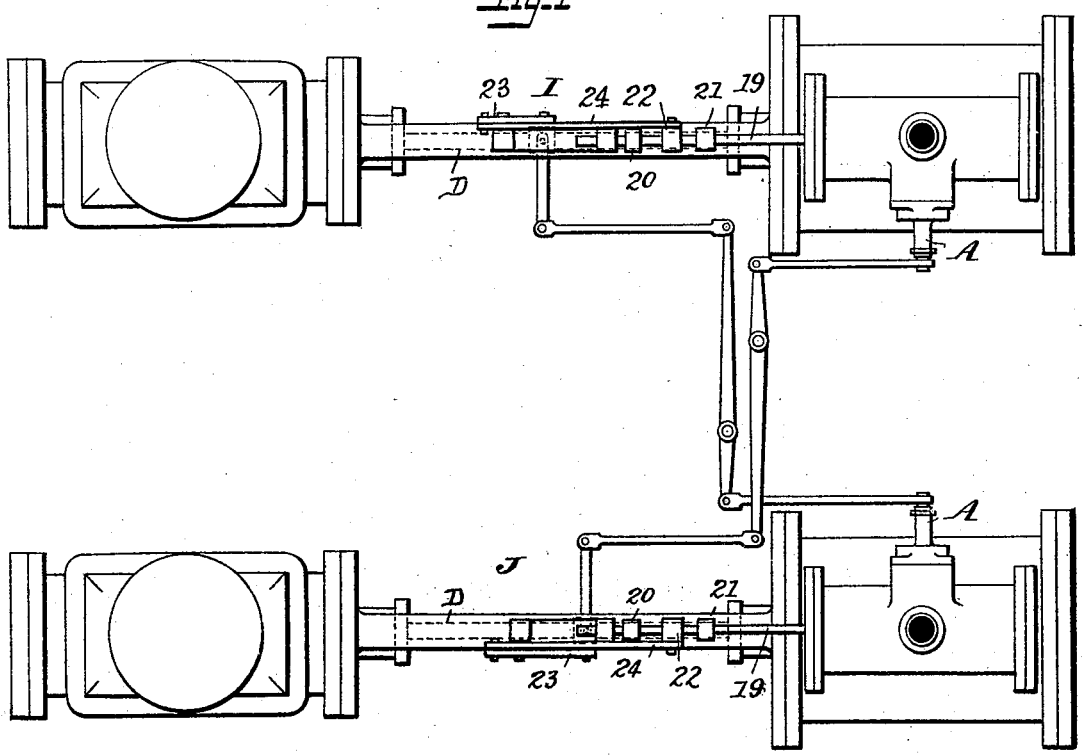
Figure 5:
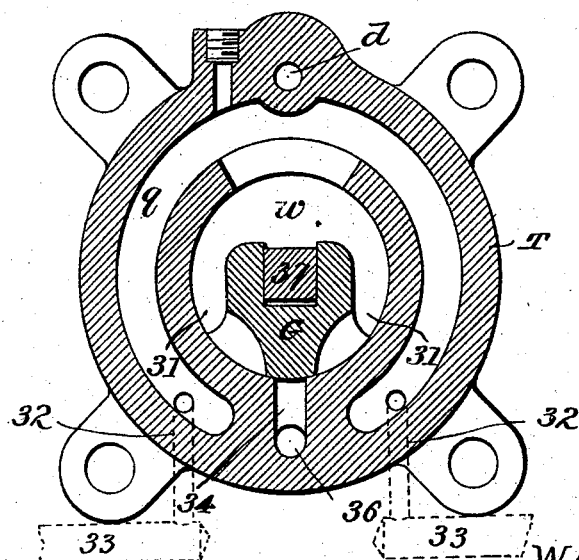

In the accompanying drawings:—Figure 1 is a diagrammatic view illustrating in plan the arrangement and connection of engines in direct acting duplex engines embodying my improvements. Fig. 2 is a longitudinal section of the valve operating devices of one of the engines. Fig. 3 is a transverse section illustrating said valve operating devices in connection with control devices embodying my improvement. Fig. 4 is a section showing said control devices in connection with a different form of valve operating device, similar for instance to that illustrated in my Letters Patent No. 503,231. Fig. 5 is an enlarged section of valve control devices taken on line 5—5, Fig. 4.

My improved mechanism is such as is used in connection with "direct acting duplex engines" arranged as shown diagrammatically in Fig. 1, where there are two engines I, J, each provided with a valve device A, the valve of each device having connections with a moving part of the other engine, which imparts motion to said valve, as for instance in the "direct acting duplex engine" illustrated in United States Letters Patent No. 398,777.

The main valve of each valve device A may be of any suitable construction, and may be connected with a suitable operating piston with any suitable connections between said piston and the operating part of the engine whereby the said piston is moved directly or positively from the ends of its casing by the action of said engine, a preferred construction, however, is that illustrated in the accompanying drawings, and also fully set forth in a separate application filed by me the 14th day of November 1893, Serial No. 490,901, in which each main valve E is connected with a hollow piston F sliding in a valve casing 8, in which besides the usual ports 5, 6 and 7, there are two supplemental ports 14, 15, each controlled by a part $t$ of the piston together with a valve 16 or 17 in a chamber $e$ in the piston F, which chamber communicates through a channel $y$ with a space or chamber between the adjacent end of the piston F and the head of the casing, steam under pressure being admitted to each chamber $z$, through a contracted port $x$. The piston rod 18 of each piston F has two adjustable stops 20, 21 between which plays a block 22 connected by a rod 24 with a lever 23 rocked by the engine. Normally the pressure in the two chambers $z$, $z$, is the same, but when by the action of the engine the piston F is brought in position to place either chamber $e$, in communication with the port 14 or 15 the said chamber $z$ at that end of the casing is relieved of pressure, when the preponderating pressure in the other chamber shifts the piston and with it the main valve E, this movement of the piston F carrying one of the supplemental valves in position to close the port through which the steam was exhausted. In connection with these devices, or with any other valve device in which there is normally an equal pressure at opposite ends of the valve operating piston, with means for relieving the pressure at either end to shift the valve, I make use of the devices which I will now describe.

T is a valve casing of an auxiliary valve device containing a channel $q$ which communicates with a valve chamber $w$, and also at each end with a port 31; a channel 32 leading to each port 31 from one of the ports 14 or 15 of the valve device described, or with the corresponding exhaust ports of any other available form of valve device. A port 34 leading to the chamber $w$ connects with a channel extending to the exhaust port 36, and this port 34 is controlled by any suitable valve as for instance a rocking valve G, upon a rock-shaft 37, extending through the casing of the valve device T and provided with an arm 38, connected through any suitable connections with any moving part of the opposite engine.

When my improved device is used in connection with a valve device of a different character, as for instance, such as shown in my Letters Patent No. 503,231, the ports 31 will be in the line of the exhaust ports $e'$ leading from opposite ends of the chest of said valve device. In such case the ports $e'$ are at the same side of the valve as in Fig. 2 hereof instead of on opposite sides as in the drawings of said patent. In either event, the valve operating piston of the engine cannot be actuated by the exhausting of the steam from either end of said piston, even when the engine valves are in position to permit such exhaust, until the valve G is moved by the opposite engine to open communication between the chamber $w$, and the exhaust port 34, but when the valve G thus opens the exhaust port 34, the steam will at once be permitted to escape from one of the chambers $z$, when the preponderating pressure in the opposite chamber will shift the piston and its valve. It will thus be seen that the valve device T is of such a character that each engine controls a valve that governs the exhaust from the valve piston operating chambers of the other engine, to thereby so shift the valve of such other engine as to insure a unison of action between the two engines.

While I have shown a certain form of valve and arrangement of ports and passages that thus control the exhaust from the chambers of each main valve operating device, it will be evident that different forms of valves and different arrangements may be employed with like effect.

It is frequently necessary in direct acting duplex engines to make repairs to one or other of the engines, in which case, it is desirable to continue the use of the engine which is in good order, or it is desirable, for other reasons to use but one of said engines at a time. Heretofore, in order to thus use the apparatus, it has been necessary to shift some of the valves and to disconnect the valve device of one engine from the actuating parts of the other. In my improved engine, no such shifting of the valves or disconnecting of the parts is necessary. Thus, I provide a by-pass or channel $d$ connecting the chamber $w$ with the exhaust 36, and in this channel $d$, I place a valve 40 of any suitable character. As shown, there is a disk valve operated from a handle 41 outside of the casing T. Normally the channel $d$ is closed, but when I desire to put one of the engines out of operation, I open the channel $d$ of the other engine, when the exhaust steam from the casing of the valve operating piston will escape through the ports 31, channel $q$, and channel $d$ to the exhaust 36, so that the valves of the engine in operation will be controlled wholly by the valve operating devices of said engine, the exhaust under the action of said devices passing directly to the port 36 without in any way being controlled by the valve G. It will thus be seen that I form a by-pass channel around the valve G controlled by a valve which may be open to practically put the said valve G out of operation without the necessity of disconnecting the said valve from its moving devices, or of shifting any of the valves to the apparatus except the valve that controls the by-pass channel.

Without limiting myself to the precise construction and arrangement of parts shown and described, I claim—

1. In a direct acting duplex engine the combination with the main valve of each engine, piston for actuating the same means for imparting initial movements to said piston and exhaust valves and ports for exhausting the pressure at the ends of said piston, of a valve device having an exhaust port, passages communicating with the ports of said exhaust valves, and a valve controlling said exhaust port and devices for operating said valve, connected with a moving part of the other engine, substantially as set forth.

2. In a direct acting duplex engine, a main valve of each engine and means for actuating the same an auxiliary valve device upon each engine having an exhaust port, a valve controlling said exhaust connected with operating devices of the other engine, and channels leading from the chamber of said auxiliary valve to the exhaust ports of the main operating valve device of said engine, substantially as set forth.

3. The combination in a direct acting duplex engine, of the main valve of one engine, the operating piston of said valve, and means for actuating the same supplemental exhaust ports, and means whereby said supplemental ports are controlled, and a casing with which said exhaust ports communicate, and provided with an exhaust port, as 34, a valve controlling the exhaust port 34, and connections between said valve and a moving part of the other engine, substantially as set forth.

4. The combination with the main valve, valve operating piston and means for actuating the same and supplemental valves and ports of an engine, of a casing having a chamber, communicating with said supplemental ports and provided with an exhaust port and valve, and a by-pass channel as $d$, extending from said chamber to the exhaust port of the engine, and provided with a valve, substantially as and for the purpose set forth.

5. The combination with the main valves and operating means of a duplex engine of a valve device on one engine having a chamber $w$ communicating with exhaust ports of the main valve, and with a valve G in said chamber controlling an exhaust port thereof, connections between said valve G and a moving part of the other engine, and a by-pass between the chamber $w$ and an exhaust port, and a valve in said by-pass, substantially as described.

In testimony whereof I have signed my name to this specification in the presence of two subscribing witnesses.

WILLIAM ALFRED DREWETT.

Witnesses:
 JOHN LOWE,
 A. R. BAYLIS.